United States Patent [19]

Berrong et al.

[11] Patent Number: 5,031,314
[45] Date of Patent: Jul. 16, 1991

[54] METHOD OF MEASURING JOINT GAPS AND RESTORING SAME

[75] Inventors: David B. Berrong, Oviedo, Fla.; Stephen J. Tencza, Norristown, Pa.; Gerald I. Marron, Broomall, Pa.; John F. Daniels, Glenolden, Pa.; Cletus L. Schartner, St. Petersburg, Fla.; Ronald P. Cupo, Ridley Park, Pa.; John J. McGettigan, Middletown Township, Delaware County, Pa.; Philip W. Ketterer, Hightstown, N.J.; Lawrence J. Coyle, Wilmington, Del.; Freddie G. King, Spotsylvania, Va.; Clifford T. Parker, Chester; Craig J. Zurat, Cressona, both of Pa.; John L. Morris, New Castle, Del.

[73] Assignee: Westinghouse Electric Corp., Pittsburgh, Pa.

[21] Appl. No.: 386,243

[22] Filed: Jul. 28, 1989

[51] Int. Cl.$^5$ .................. B23P 15/00; B23P 13/04
[52] U.S. Cl. .................. 29/889.2; 29/888.021; 29/888.3; 29/890.121; 29/890.128; 29/407; 29/557

[58] Field of Search ........... 29/402.01, 402.02, 402.04, 29/402.05, 402.06, 402.18, 402.19, 888.02, 888.021, 888.3, 889.1, 889.2, 890.03, 890.031, 407, 888.06, 557, 558, 890.12, 890.121, 890.126, 890.128; 356/371, 376; 73/104, 105, 865.8; 33/832, 833; 403/11; 277/1, 2; 408/16, 701; 51/165.72

[56] References Cited

U.S. PATENT DOCUMENTS

| | | | |
|---|---|---|---|
| 4,118,139 | 10/1978 | Lemelson | 408/701 X |
| 4,860,650 | 8/1989 | Houser | 101/181 X |
| 4,895,448 | 1/1990 | Laird | 356/376 |

Primary Examiner—Joseph M. Gorski
Assistant Examiner—S. Thomas Hughes

[57] ABSTRACT

The method of the present invention uses a combination of gap measurement methods to map the gap in a joint in a high pressure vessel such as a steam turbine or steam valve. An exposed and supported surface is hydraulically balanced allowing any twisting of the surface to be removed. The map is then created using a blue contact method, feeler gages, deformable gap measuring medium and laser profiling for both surfaces of the joint. A restoration plan is produced using the map which minimizes the restoration work and produces matching joint surfaces. The joint surfaces are welded and/or machined and finally finished in accordance with the plan. A laser can be used to guide or reference the machine tool. Matching joint surfaces, especially if relatively flat, provide a better high pressure seal than relatively flat surfaces that do not match while relatively flat surfaces that do match produce an even better seal.

11 Claims, 5 Drawing Sheets

|   | L | M | N | O | P | Q | R | S | T | U | V | W | X | Y | Z |   |
|---|---|---|---|---|---|---|---|---|---|---|---|---|---|---|---|---|
|   | . | . | . | . | . | . | . | . | . | . | . | . | . | . | . | · 70 |
|   | . | . | . | . | . | . | . | . | . | . | . | . | . | . | . |  |
|   | . | . | . | . | . | . | . | . | . | . | . | . | . | . | . |  |
|   | . | . | . | . | . | . | . | . | . | . | . | . | . | . | . |  |
|   | . | . | . | . | . | . | . | . | . | . | . | . | . | . | . | · 65 |
|   | . | . | . | . | . | . | . | . | . | . | . | . | . | . | . |  |
|   | . | . | . | . | . | . | . | . | . | . | . | . | . | . | . |  |
|   | . | . | . | . | . | . | . | . | . | . | . | . | . | . | . |  |
|   | . | . | . | . | . | . | . | . | . | . | . | . | . | . | . | · 60 |
|   | . | . | . | . | . | +46 | +46 | +56 | . | . | . | . | . | . | . |  |
|   | . | . | +53 | +54 | +64 | +66 | +63 | . | +57 | +40 | . | . | . | . | . |  |
|   | . | . | +55 | +65 | . | +30 | . | -15 | +59 | . | +27 | . | . | . | . |  |
|   | . | . | +49 | +76 | . | . | . | . | . | -29 | +22 | +37 | . | . | . |  |
|   | . | . | +62 | +66 | . | . | . | . | . | . | +2 | +30 | . | . | . | · 55 |
|   | . | . | +63 | +35 | . | . | . | . | . | . | . | +28 | +45 | . | . |  |
|   | . | . | . | +29 | . | . | . | . | . | . | . | +41 | +43 | . | . |  |
|   | . | . | . | +44 | . | . | . | . | . | . | . | +42 | +48 | . | . |  |
|   | . | . | . | . | . | . | . | . | . | . | . | +53 | +35 | . | . |  |
|   | . | . | . | . | . | . | . | . | . | . | . | +52 | +48 | . | . | · 50 |
|   | . | . | . | . | . | . | . | . | . | . | +64 | +62 | +48 | . | . |  |
|   | . | . | . | . | . | . | . | . | . | . | +83 | +63 | . | . | . |  |
|   | . | . | . | . | . | . | . | . | +119 | +101 | +85 | +68 | . | . | . |  |
|   | . | . | . | . | . | . | . | . | +129 | +44 | +89 | . | . | . | . |  |
|   | . | . | . | . | . | . | . | . | +120 | +100 | +91 | . | . | . | . | · 45 |
|   | . | . | . | . | . | . | . | . | +113 | +107 | . | . | . | . | . |  |
|   | . | . | . | . | . | . | . | . | . | +104 | . | . | . | . | . |  |
|   | . | . | . | . | . | . | . | +123 | +132 | +105 | . | . | . | . | . |  |

METHOD OF MEASURING JOINT GAPS AND RESTORING SAME

BACKGROUND OF THE INVENTION

1. Field of the Invention

The present invention is directed to a joint gap measurement and restoration method and, more particularly, to a method which matches the surfaces of a joint to prevent leaks from a high pressure vessel such as a steam turbine.

2. Description of Related Art

During the normal operating period of a steam turbine, between maintenance outages, which occur approximately every five years, erosion may occur in and around the joint surfaces between the turbine high pressure cylinder cover and the cylinder base. When gaps between the joint surfaces occur, high pressure steam is lost from the turbine reducing turbine efficiency. The leaking steam also creates an avoidable but unwanted safety problem for people working around the turbine The steam is made of expensive high purity water causing additional economic losses over and above the efficiency losses previously mention above. Typical approaches to minimizing the creation of joint gaps and repairing the gaps include providing a sealant on the joint surfaces prior to mating and repairing the joint surfaces using a blue plating method. In the blue plating method, the surface of the base and the cover are separately processed to produce independently referenced flat surfaces. During this process a feeler gauge is used to detect the gaps in the joint prior to removal of the cover from the base. Once the cover is removed, each of the joint surfaces is coated with a prussian blue contact detection medium A relatively heavy surface plate approximately 1½ feet by 4 feet on one of the joint surfaces When the plate is inverted the amount of prussian blue medium from the plate indicates the location of high spots and the relative flatness of the joint surface covered by the plate with respect to the plate. The joint surface is then repaired by filling in low spots with welding and taking off high spots. The high spots are traditionally removed with power scrapers, files, sanders and finishing stones. The process of applying the plate to the same location, examining the blue contact area and repairing the surface continues until approximately 100% of the plate is blue. The plate is then moved to another location and the process of producing a flat surface is continued. Once one surface of the joint is flat relative to the movable plate, the other joint surface is examined and repaired in the same manner. This prior art process creates a relatively flat surface with respect to the metal surface plate. Even with a relatively flat cover joint surface and a relatively flat base joint surface, the cover and base-joint surfaces do not necessarily match and gaps may continue to exist Because the gap may not be at a minimum on the seal surfaces of the joint, erosion can cause bad gaps to develop more easily. A turbine is typically 30 feet long and 12 feet wide with a linearly measured joint surface of approximately 84 feet. The blue plate process is thus very time consuming because the entire surface of both the base and the cover of the turbine must be examined and repaired.

SUMMARY OF THE INVENTION

It is an object of the present invention to produce a joint that prevents leaks from a high pressure atmosphere.

It is another object of the present invention to create matching joint surfaces to prevent leaks.

It is also an object of the present invention to reduce the time required for joint restoration by eliminating the need to restore the entire surface.

It is an additional object of the present invention to document the joint restoration in detail allowing future designs of joints to be improved based on accurate historical restoration records.

It is still another object of the present invention to document joint topography in detail to enhance the restoration process during future outages.

It is also an object of the present invention to provide a method that allows joint inspection and restoration to be treated as a whole rather than as a series of rectangular areas.

The method of the present invention uses a combination of gap measurement methods to map the gap in a joint in a high pressure vessel. The map is created using blue joint surface contact measurements, feeler gage measurements, deformable medium gap measurements and laser profiling to not only create an accurate map but to confirm gap measurements. Based on the map, a restoration plan is produced and followed which minimizes the restoration work and produces matching joint surfaces. Matching joint surfaces generally provide a better high pressure seal than relatively flat surfaces that do not match and relatively flat surfaces that do match provides an even better seal.

These together with other objects and advantages which will be subsequently apparent, reside in the details of the construction and operation as more fully hereinafter described and claimed, reference being had to the accompanying drawings forming a part hereof, wherein like numerals refer to like parts throughout.

DESCRIPTION OF THE PREFERRED EMBODIMENTS

In general the method of the present invention starts by separating the turbine cover from the base by raising the cover enough so that surface of the base and the cover can be cleaned and inspected for erosion. The cover is then dropped back on the base to perform a gap check of the joint. This gap check involves performing a blue contact check, a feeler gage gap check and a deformable medium check. Once this series of checks is completed the cover is removed from the base and inverted exposing the cover joint surface. The cover, after inversion, is installed in a stand which supports the cover on hydraulic jacks at four locations where the jacks have a common manifold. The base and cover joint surfaces are then profiled using a conventional laser profiling technique. The data produced by the various gap checks and profiling is evaluated and used to prepare a repair recommendation or plan that follows general repair guidelines. This plan is then followed to perform the surface refinishing in the limited area on both joint surfaces necessary to restore the joint and match the surfaces of the base and cover to each other. When final finishing is complete a baseline or laser profile is obtained for reference during the next restoration outage and the cover is turned over and mated with the base for final gap acceptance tests. The sequence of events described herein could be performed in another or different order for different devices such as high pressure valves, depending on device characteristics.

The method of the present invention is designed to match the surfaces of the base and cover with a gap in the gland area of less than about 0.004 inches in the relaxed/unbolted condition. This is designed to produce a 0.000 inch gap after assembly. The method also produces a rate of change of the height of the surface of no more than about 0.001 inches every 4 inches. A gap between surfaces in the joint of a high pressure vessel, such as a steam turbine, which meets these requirements produces a substantially leakless metal to metal facing surface joint that does not require a sealant between the metal surfaces.

Figure 1:
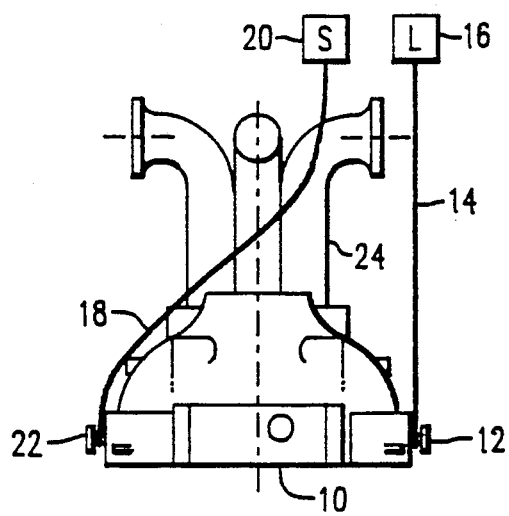
FIGS. 1-6 illustrate the procedure for inverting a high pressure steam turbine cover.
Figure 2:
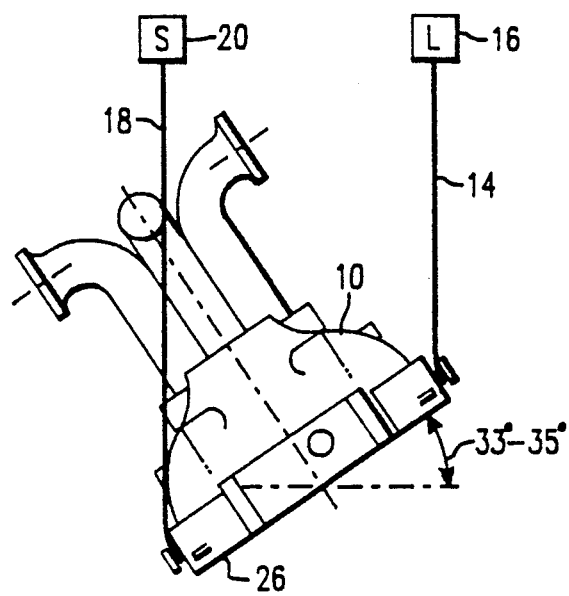
Figure 3:
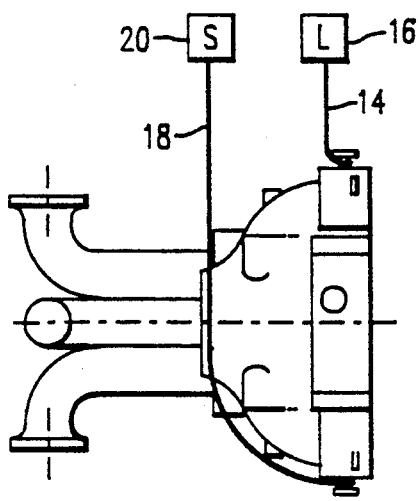
Figure 4:
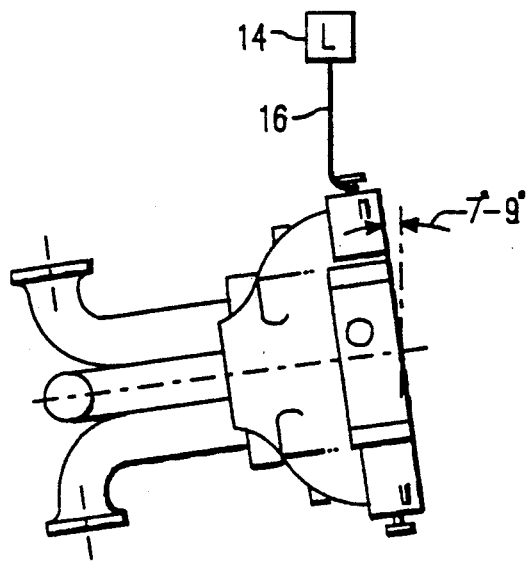
Figure 5:
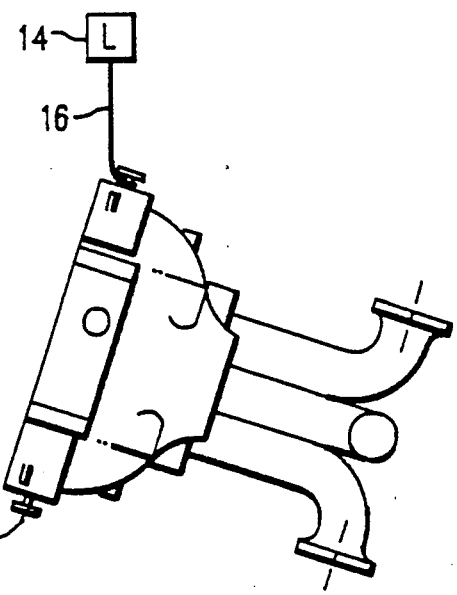
Figure 6:
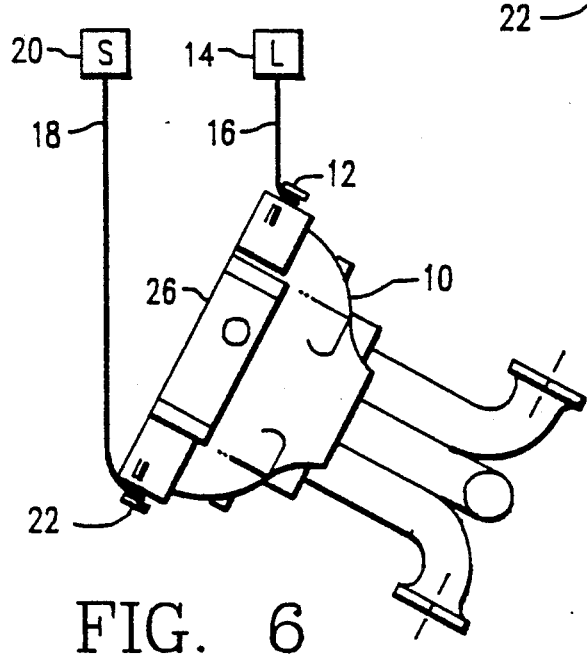

Before describing the method of the present invention in detail, because a turbine cover typically weighs approximately sixty tons, and because the cover must be turned over several times, the procedure for safely turning over a turbine cover will be discussed in detail. Prior to removal of the cover a temporary support surface for the cover needs to be created. It is preferred that railroad cross ties be used to create a temporary frame for supporting the cover prior to turning the cover over to prevent damage to the seal surface. The cover 10 is placed on the floor in the middle of the cross ties. Next two 75,000 lbs. safety hoist ring assemblies 12 are installed on the one side of the cylinder cover 10 as illustrated in FIG. 1. Two 1.375 inch by 20 foot cables 14 are attached to the big hook 16 of a crane. Two 2 inch by 26 foot cables 18 are attached to the small hook 20 of the crane and to the lifting lugs 22 of the cover 10. The slack in the small hook 20 is taken up until the small hook cables 18 just begin to touch the equilibrium pipe 24 of the cover 10 as illustrated in FIG. 1. The side of the cover 10 with the big hook 16 is started lifting with the pivoting of the cover 10 occurring on the small hook side. The slack is kept out of cable 18 as this lifting occurs. When the joint surface reaches an angle of 33-35°, as illustrated in FIG. 2, the cover 10 is lifted vertically to a height high enough so that the pipes 24 will not contact the floor when the cover joint surface 26 faces upward and is horizontal that is, the joint up position. When the cylinder cover 10 is high enough so that the pipes 24 will clear the floor, the cover 10 is started turning by letting off on the small hook 20 and taking up on the big hook 16 until there is no weight on the small hook as illustrated in FIG. 3. When the weight has been completely let off the small hook 20, that is, the cover is freely suspended on the large hook 16, the horizontal joint surface will be about 7-9° off the vertical center line as illustrated in FIG. 4. The small hook is disconnected and the cylinder cover rotated or spun about the large hook axis 180°, so that the small hook can be reattached to the same lifting lugs 22 without changing crane positions, as illustrated in FIG. 5. Next the small hook is attached to the same lifting lugs 22, as illustrated in FIG. 6, and the small hook is used to lift the cover on that side until the horizontal joint surface 26 is facing upward and is horizontal. Both hooks are then operated in tandem to place the cylinder cover 10 in a set of hydraulic jacks with a common manifold. The hydraulic jack support surfaces are placed under the lifting lugs. A hydraulic support frame such as Enerpac ®, which is available from Applied Power Corporation, automatically balances the pressure on the lifting cylinder at the four corners of the cover associated with the lifting lugs, thereby automatically levelling the cover with respect to the cover center of gravity. That is, the cover floats on the hydraulic jacks in a balanced position similar to the way a boat will float in water in a balanced position. To turn the cover back over the procedure discussed above is reversed.

Prior to unbolting and removing the cover 10, the unit joint should be checked for escaping steam, discoloration or concentrations of moisture while the unit is operating and prior to the maintenance shutdown. A visual inspection of the joint area to locate apparent leaks should also be performed. The plant operator should also be consulted to determine whether there has been any evidence of a horizontal joint leak since the last maintenance outage. Any obvious cracks or serious defects detected by a visual inspection should be radiographically tested. At this time four points on the corners of the joint are marked, the joint surface elevations at the points are determined using a conventional optical level and a stressed joint reference plane is created by the recorded elevations.

Once the unit is out of operation the cover 10 is removed and the blade rings of the turbine are removed. If something else, such as a large high pressure valve joint surface rather than a turbine cylinder, is being inspected and repaired, the valve interior movement mechanism is removed.

Once the blade rings are removed the cover 10 is repositioned on the base. The exterior of the cylinder on both sides of the joint surface is periodically scribed with chalk or crayon such that a grid pattern is created in the joint plane by phantom lines connecting the scribe marks. A grid crossing point should always bisect the center of the nozzle block allowing the grid to be consistent from outage to outage and if the grid needs to be reproduced during a restoration. The grid lines should be approximately 4 inches apart. A representation of each joint surface with the grid thereon is created on paper or in a computer database.

With long feeler gages the joint is checked from the inside and outside for horizontal joint gaps and the values of the gaps are recorded on the paper grid map of the joint or in the computer database. At this time the points on each of the four corners of the joint previously marked are used to optically measure the elevation of the four points. These four points are also recorded on the chart or in the database and create a unstressed reference plane for the surface The recorded measurements are examined mathematically to determine if the four points lie in a single horizontal plane. It is also possible to perform this plane check with two midspan points in addition to the corner points.

The optical planar reference for an unstressed joint can be compared to a stressed joint and this will point out any twisting in the cover and base.

Figure 8:
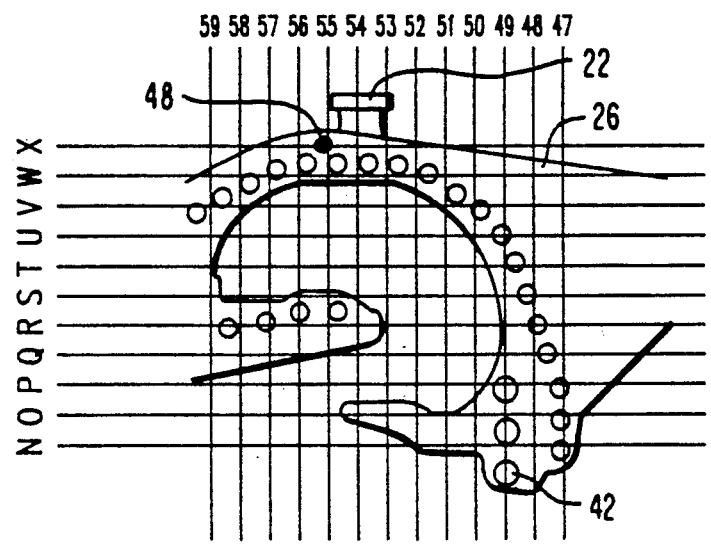
FIG. 8 illustrates the grid pattern used to take surface and gap readings.

Next the base and cover joint surfaces need to be cleaned. This operation is not intended to be a metal removal process and as a result some types of abrasive blasting and belt sanding should not be used. This operation requires that the cover be lifted above the base enough so work can be done on the surfaces. An alternative that is timewise more inefficient is to invert the cover so that both the cover and base joint surfaces are in the upward facing position. This makes cleaning easier but requires that the cover be inverted twice, a time consuming operation. The cleaning operation is designed to remove any sealant, surface scale or surface rust. The joint surfaces and bolt holes are preferably hand cleaned using spirits and fine emery cloth. Abrasive blasting is permitted if the blasting media is glass beads having U.S. sieve designation 50 maximum and minimum 80% spherical count. Walnut shells may also be used as an abrasive using the MSMH sieve size for medium shells. Once the surfaces have been cleaned the joint surfaces are wiped dry and free of dust, the grid pattern marked on the outside of the cover and base is marked on the joint surface using a straight edge creating 4 inch squares, as illustrated in FIG. 8.

Next, a blue check is performed. This check involves coating the base joint surface with a red dye and the cover joint surface with prussian blue. These coatings can be allowed to stay on the surfaces to prevent further rust during inspection and restoration. The cover 10 is lowered onto the base with the lifting shackles let slack for approximately one minute. The cover 10 is then lifted and the blue contact readings are recorded on the paper charts or in the computer database. If FIG. 8 is being used as an example of a paper chart, the blue contact reading is recorded as a spot 48 of approximately the same size as the blue spot on the charts for the cover and the base and indicates a high point or small gap area. In the computer database, the blue spot is indicated by its grid reference location, shape and approximate size. Any visual cutting or pits visually detected during the cleaning are also noted on charts.

Figure 9:
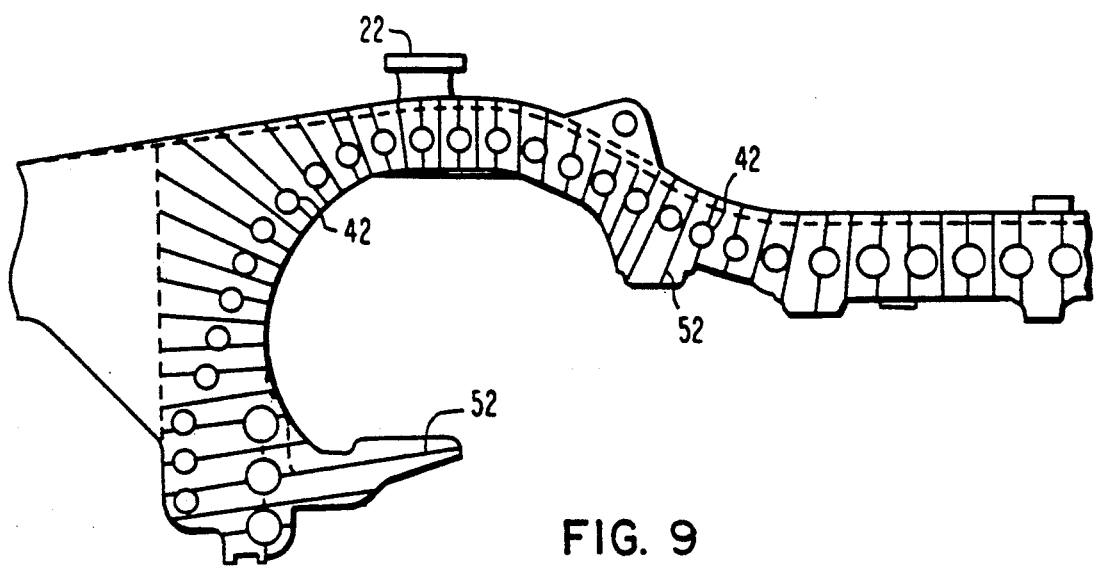
FIG. 9 is an alternate pattern for determining joint gap.

With the cover 18 inches above the base a pattern of plastigage strips is laid across the base joint surface using a deformable gap measuring medium, such as Plastigage TM strips or strings from 0.002 to 0.006 inches in size. Plastigage available from Sealed Power Corporation. This pattern of strips can be laid on the grid lines of the base joint surfaces as illustrated in FIG. 8 or in other joint surface patterns such as the radial joint surface pattern illustrated in FIG. 9. The cover is lowered onto the base and the lifting shackles are allowed to go slack for approximately one minute. Because the Plastigage TM is a compressible medium, the strips will be compressed to varying degrees by the weight of the cover, with the width of the compressed strip corresponding to the size of the gap at that location. The cover is then lifted and the readings for the gap are recorded on the paper charts or in the computer database at every grid cross point. The readings are performed using a chart provided with the Plastigage TM. If any of the areas of the joint have a gap which exceeds 0.006 inches a strip of 0.012 inches is substituted and the procedure discussed above is repeated. If a strip is compressed such that it goes off the chart, a smaller strip is substituted and the procedure of lowering the cover, removing the cover and taking readings discussed above is repeated. The strip measurements also allow detection of abnormal variations between grid points and such abnormal points can also be marked on the chart and in the database. The deformable material is removed from the base joint surface.

The cover is then lowered back down onto the base such that the lifting shackles are slack and the long feeler gages are again used to produce feeler gage measurements at the grid lines on the inside and outside of the turbine. Access to the inside is through a manhole These measurements, which measure visible gaps in an unstressed state, are recorded on the paper charts or in the computer database.

Figure 7:
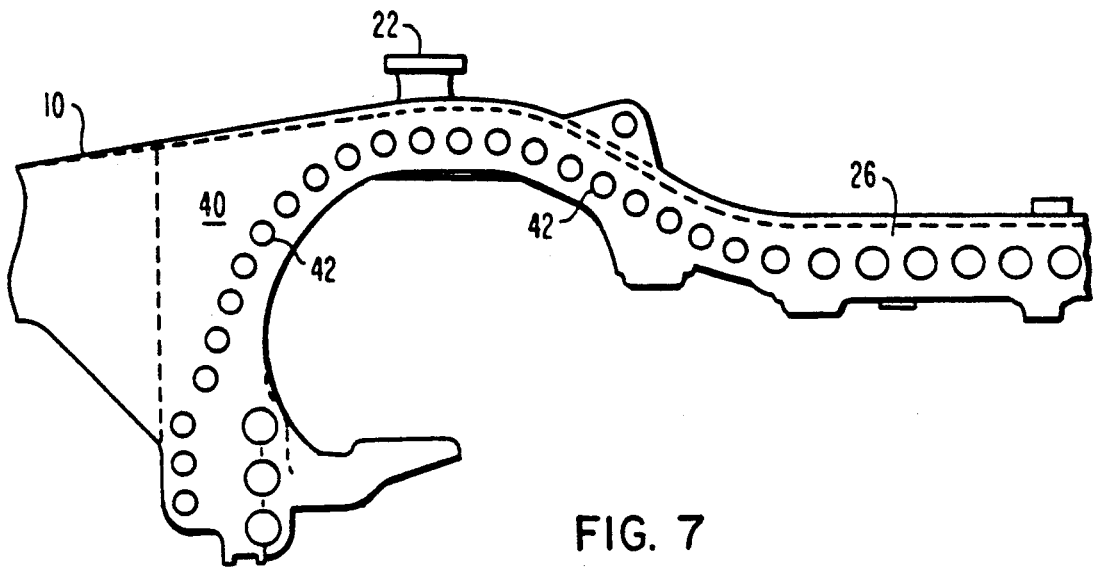
FIG. 7 is a plan view of a portion of a joint surface.

The cover 10 is then removed and inverted to expose the cover joint surface, a portion of which is illustrated in FIG. 7. The area 40 inside the dotted line that includes the bolt holes 42, which are typically $2\frac{1}{2}-4\frac{1}{2}$ inches in diameter and 2-6 feet long, is the joint sealing surface which is to be inspected and which is typically 6-12 inches wide. Once the cover is removed the optical level of the base and cover are again taken and recorded on the chart or in the database. These values are compared to the values previously taken for a tightened cover to determine whether any twisting of the cover has occurred relative to a sealed joint condition. If the joint being inspected and repaired is flexible and can be untwisted the supports should be adjusted or additional supports added so that any twist in the removed cover is removed.

With the cover 10 inverted, exposing the joint surface of both the base and the cover 10, a laser profile of both of the joint surfaces is performed. A conventional laser profiling system includes a computer 60, such as an IBM PC, with an interface 62 which is connected to a laser target 64 that determines the relative height of the joint surface 26 based on a rotating laser beam 66 produced by a laser turret 68. The preferred laser profiling system is a model 711 system available from Hamar Laser Instruments.

Before setting up the laser profiling system, the environment around the cover or base being measured should be enclosed to prevent air drafts in the beam path area which will disturb measurements at the accuracy of the final surface. This environmental control includes maintaining a relatively consistent temperature and covering bolt holes and drains which would normally allow air circulation in and around the surface of the cover or base. The laser measurements are sufficiently sensitive that it is preferred that measurements be made at night when sunlight through windows and reflected from interior surfaces will not cause localized heating and thus localized air currents around the joint surfaces. More importantly, strong artificial light and direct or indirect sunlight incident on the target will cause inaccurate readings and needs to be prevented. Dark green plastic can be used as a shield.

The laser turret 68 should be positioned at a point outside of the contact surface 40, so that the entire contact surface 40 can be measured without requiring movement of the laser turret 68. On most turbine covers and bases this position would be in a corner at one end, the governor end preferably and outside the sealing surface if possible. The same position should be selected for both the cover and the base if possible, however, this is not necessary. The turret 68 should be balanced and adjusted to produce an accurate horizontal sweep plane by following the directions available with the laser system. The location of the turret 68 should be marked on the surface and the chart to allow reproduction of placement at a later time, for example during final inspection.

The height of the swept beam should be set and the height of the target 64 sensor should be set so that the beam will remain within the target sensor throughout a measurement. This is obtained by selecting at least three buck points on the joint surface which are used to create another or profile reference plane. The buck points are generally selected at grid crossing points in the corners of the cover or base that are farthest from the laser turret 68 and a few inches from the outside edge of the seal surface. By reviewing the gap data obtained with the Plastigage ™ readings, points with a very small gap or relative low points should be chosen as the buck points. By choosing the buck points in areas where the gap is very small or as low points, it is likely that machining will not have to be performed in those areas, thereby changing the height of the buck points. It is, of course, obvious that channels or grooves where steam leaks have been occurring should not be selected as buck points since the probability is very high that these points will be built up by welding during restoration. The buck points on the cover and base should be approximately in the same place if possible, however, this is not necessary. By selecting the buck points appropriately, the laser beam should be kept within the linear range of the target 64 throughout a joint surface measurement. It is also possible to systematically determine the buck points by making a measurement at each crossing point on the grid and selecting as buck points grid points with small deviation readings with respect to the plane created by the swept laser beam. The location of the buck points is marked on the surface and recorded on the chart or in the database. After the turret and target calibration, the system should be allowed to stabilize for from 45-60 minutes. Once the calibrated system has been rechecked after the stabilization period, measurements, in the grid pattern previously established, at the grid points can be performed.

Figures 10, 11:
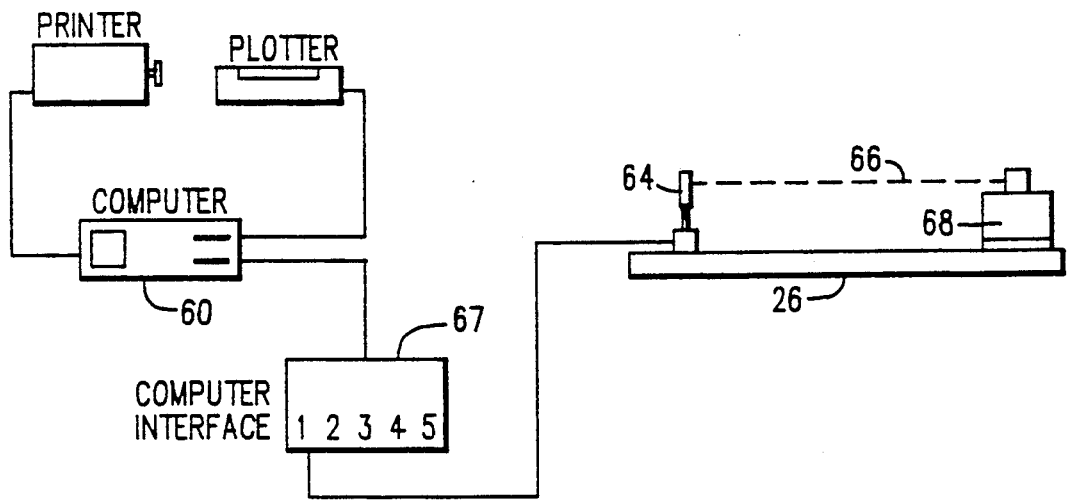
FIG. 10 illustrates the components of a laser profiling system.
FIG. 11 illustrates the laser profile readings.

During measurements the laser target 64 is positioned over the selected grid point and the target point is brought to rest on a clean dry surface. The target head should be turned so that the laser beam shines into the middle of the target window. The window of the target 64 causes a reflection back toward the turret 68 and if a backdrop is set up behind the laser turret 68, the target head can be twisted until the reflection hits the turret 68. The computer takes a minimum of thirty and preferably fifty samples at each point, averages them, and stores the average height sample in a database correlated to the grid pattern, so that a surface representation of relative heights, as illustrated in FIG. 11, can be produced for both the base and cover surfaces. In this figure, the buck point is at V55. The buck points should be remeasured periodically during the profile measurements to insure that the laser turret 68 has not moved. The measurement pattern should be fairly tight to keep rotation of the turret 68 at a minimum.

Figure 12:
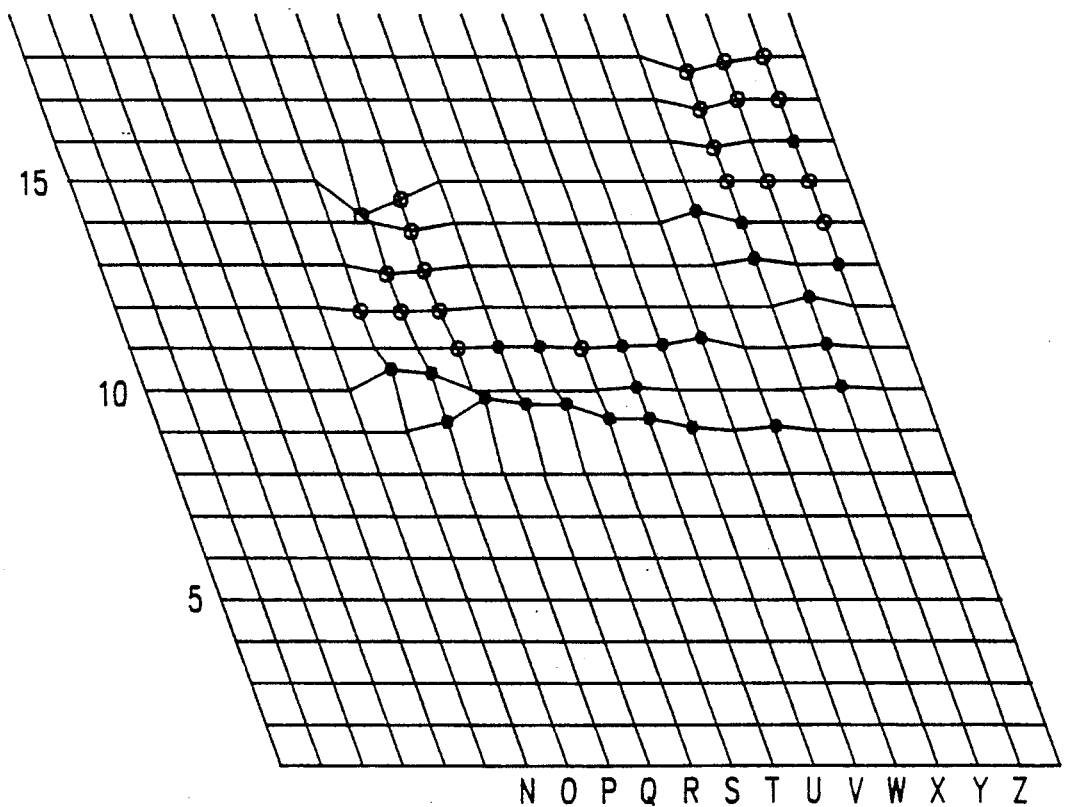
FIG. 12 illustrates a topographical map of a joint surface used to produce a repair plan.

The data can then be used to create a topographical map of the joint surface, for example the cover surface, as illustrated in FIG. 12. In this topographical map, circles indicate points below the reference plane created by the buck points, points above the reference plane created by the buck points are indicated by solid dots and points on the plane would be represented by circled dots. No points on the plane exist in this figure. The buck point in this topographical depiction is at position X15. In this figure, when a dot or a circle or a circled dot does not exist, no data was taken for that point.

The surface profile data can be combined with the Plastigage ™ data or the profile data for both surfaces can be combined by setting the highest contact points as a zero gap point and a topographical map of the gap thickness can be created similar to the profile map of FIG. 12. The blue contact points are generally the highest contact points and should be used to set the zero gap point. This map can also be rotated, etc., using conventional three-dimensional rotation techniques and displayed on a CRT or paper at any angle.

Occasionally, it will be discovered that the buck points define a slanting surface with respect to the actual surface of the joint thereby producing a representation that indicates many points are a large distance from the reference plane on one end or in a corner. This situation has occurred because the buck points were inappropriately chosen. It is possible and desirable if this occurs, so that an accurate visual representation of the surface can be produced for repair purposes, that the data be adjusted to take into account the inclination of the reference plane. This can be accomplished by picking two points on the plane which can be used to adjust the height data to remove the tilt. The difference between the two points is divided by the grid reference distance between the two points and produces a gradient that is used to calibrate or adjust the data to the newly defined reference plane. It is also possible to adjust the plane to coincide with the stressed or unstressed reference planes previously determined.

Once the laser profile readings are completed and the various graphs associated with the gap measurement methods are produced, a repair plan is developed using these graphs and maps. In general common sense is used to develop a plan that makes as few repairs as possible. However, the following guidelines will generally provide an efficient plan. Preference is for takedown machining over welding build-up because it takes less time. This particularly applies to deciding which surface to start reworking to obtain a particular gap. The surface with the highest deviation from the described reference plane is generally chosen for reworking first. Critical seal areas such as the gland and blade ring areas of a turbine should be as flat as possible. Defects or gaps closer to the inside, especially inside the bolt hole pattern, receive priority over defects further out. All grooves and cuts which are visually identifiable are filled in. All high spots are taken down and low spots are filled and brought flush to the adjacent area unless the gap associated with the spot is less than 0.001 inch. If an area of a gap is surrounded by an area of a good match (a gap less than 0.001 inch), fill in and the match across the entire area. If such an area is outside the bolt hole pattern, give to the lowest priority or do nothing. If the area of the gap is large and the adjacent areas of a good match are small and can be machined down to cause a good match across the area, machine the surrounding area down on the side with the highest deviation from the reference plane. If adjacent areas change height rapidly (at least 0.002 inches per four inches) producing a rapid gradient, weld build up is preferred. Areas with a large number of rapidly varying gaps may need a set of smaller increment laser measurements, for example one inch apart, and a local reference plane and a repair subplan for that area can be created following the above guidelines. When large areas for machining are encountered 2 inch square reference areas centered on a grid point are selected first and worked to the desired plane first. The reference areas allow gradients to be created two dimensionally while rapidly producing the desired surface.

Once the plan is developed, one of the joint surface areas to be repaired is selected. During the repair procedure, high spots are removed by scrapping or lapping while low spots are built up by welding. Conventional welding repair techniques are used in which grinding is used to obtain clean metal, the periphery of the area to be built up is staked and the adjacent surface areas to the build up area are raised approximately 0.01 inches to prevent undercutting. Conventional welding techniques are used which can include maintaining interpass temperatures and post weld magnetic particle inspection. Areas larger than 12×18 inches must be welded in steps. If necessary, welding stress relief techniques such as ball peening should be used subsequent to the weld repair. The raised welded areas are then scrapped or lapped or machined down to the desired reference surface. Some rather large areas of the surface can be machined with a machine tool such as the RTPM6 from Master Mill. The spindle should be perpendicular to the surface being machined. The machining operation uses conventional machining techniques in which the machine head operates using a machining reference plane. The machining reference plane is created and brought into coincidence with the profile reference plane by selecting three points within a 12 inch by 12 inch selected machining area. The three points are grid points at which profile measurements have been made. It is also possible and preferable to use 3 grid points outside the selected machining area if the 3 points are on the desired reference plane and are fairly close to the selected machining area. The selected grid points can be remeasured using the laser profiling system if desired. The machine head height indicator is brought into contact with the surface at the three points. The measurements made by the height indicator are adjusted to match the profile measurements making the measurements fit a common reference plane. The machine tool can then be operated, based on the reference plane, to machine spots in the selected area to approximately the desired height (plane) to create matching surfaces. The laser profiling unit previously discussed with respect to FIG. 10 can also be used to guide and/or control the movement of the machine head to cut to a desired plane with respect to the repair plan. This can be accomplished by mounting the target on the machine head and controlling the height of the machine head using the laser height measurements. The machine head can then be used to machine spots to the desired heights (plane) with respect to the plan.

It should be noted that if it becomes necessary to weld repair a buck point, the buck point should be left until last. During the machining process, it is important that an area no larger than 12×18 inches be selected for machining and that the machine be trammed in the X and Y axis direction in an unwelded section adjacent to the section to be cut. The laser readings, used to set the unwelded spots, should be referred to, so that the joint surface will be within 0.001 inches of the desired plane. When the machine has been set and trammed, the machine tool is used to machine a build up area to within 0.003 to 0.005 inches of the desired plane. This means that the machine should cut to within 0.003 inches of the desired plane not within this tolerance of the adjacent surface.

After machining a set of 12×18 inch spots a record is made using the profiling laser of how much above the adjacent 12×18 inch spots the new plane is located. Acceptable limits should be 0.003 to 0.005 inches above the desired plane. During this process a small blue plate can be used to check the repair as it progresses. Periodic checks of the surface height during the machining process should be made to insure that the desired joint plane with respect to the plan is being established.

Final joint finishing is accomplished by reworking the entire newly machined surfaces with bastard and second cut files, 4 inch electric grinders, power scrapers, finishing stones and emery cloth to remove any steps or high spots and bring the surface to within a ±0.001 inch tolerance of the desired surface. Scrapers with a "k" land style rather than gasket removal blades should be used. A surface near the reworked area that is flat can be used as a reference when generating a localized desired plane for the final finishing. This reference surface should be cleaned and checked with a 3 foot by 4 foot by 7/16 inch blue plate. The reference area should be worked until at least a 90% blue contact area shows on the plate and no clear lines from inside to outside exist. When the 90% contact has been established the plate is moved toward the reworked area one-third the length of the plate and another 90% blue contact area is outlined. By allowing a 90% contact area the surface height is allowed to gradually change allowing this procedure to help establish the final surface to within the desired gradient.

After the final finishing is complete a final laser check is performed using the original buck points to reference the laser beam. This final check becomes a reference profile for future examinations and repair. The Plastigage ™, feeler gage and blue check procedures previously discussed should be also used to create a reference database for future repairs. This data also becomes the reference data used to qualify the joint for final acceptance. The final acceptance criteria is generally no gaps larger than 0.004 inches in the gland area in an unbolted or relaxed state and a rate of change less than or equal to 0.001 inches per 4 inches.

The many features and advantages of the invention are apparent from the detailed specification and thus it is intended by the appended claims to cover all such features and advantages of the invention which fall with the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For example, the grid line spacing could be reduced to for example 1 inch and thereby provide an even more accurate matching set of surfaces.

We claim:

1. A method for producing a joint between first and second surfaces, comprising the steps of:
   (a) measuring a gap between said first and second surfaces of the joint, thereby determining a profile for each surface; and
   (b) matching said first and second surfaces to each other by altering at least one of said surfaces, said altering depending on the profile of each of said surfaces, thereby reducing the gap.

2. A method as recited in claim 1, wherein a height rate of change of each surface of the joint is within a predetermined value.

3. A method as recited in claim 1, wherein step (a) comprises measuring the gap using a compressible gap measuring medium.

4. A method as recited in claim 1, wherein step (a) includes creating maps of the first and second surfaces and the gap.

5. A method as recited in claim 1, further comprising creating a gap reference profile after the gap is reduced and matching surfaces are produced.

6. A method as recited in claim 1, further comprising recording the gap on a reproducible reference grid.

7. A method as recited in claim 1, wherein step (b) includes laser guided machining said surfaces.

8. A method of producing a joint, comprising the steps of:
(a) measuring a gap between surfaces of the joint comprising:
  (a1) profiling a height variation of the surfaces of the joint; and
  (a2) combining the profiles to produce a gap profile; and
(b) reducing the gap and producing matching surfaces by repairing the surfaces of the joint relative to each other.

9. A method as recited in claim 8, wherein step (a1) includes reducing air circulation over the surfaces and averaging plural measurements for each measurement point.

10. A method as recited in claim 8, wherein a reference plane is designated for each profile.

11. A method of producing a joint for a steam turbine cylinder having first and second surfaces, comprising the steps of:
A) measuring a gap between said first and second surfaces of the joint, thereby determining a profile for each surface, comprising the steps of:
  (a) cleaning and inspecting the first and second surfaces for erosion;
  (b) creating a reproducible reference grid on the first and second surfaces;
  (c) performing a blue contact gap check with the first and second surfaces confronting each other;
  (d) performing a feeler gauge gap check with the first and second surfaces confronting each other;
  (e) performing a gap check with a deformable gap measurement medium with the first and second surfaces confronting each other;
  (f) profiling the first and second surfaces using a laser measuring system; and
  (g) producing a plan for matching the first and second surfaces with results of steps (c)-(f) to produce a gap less than or equal to a predetermined value and less than a predetermined surface height variation; and
B) matching said first and second surfaces by altering at least one of said surfaces, said altering being performed by refinishing the first and second surfaces only in areas where the predetermined value and variation are exceeded and depending on the profile of each of said surfaces, thereby reducing the gap.

* * * * *